3,681,084
METHOD OF PRODUCING A POTATO SNACK PRODUCT

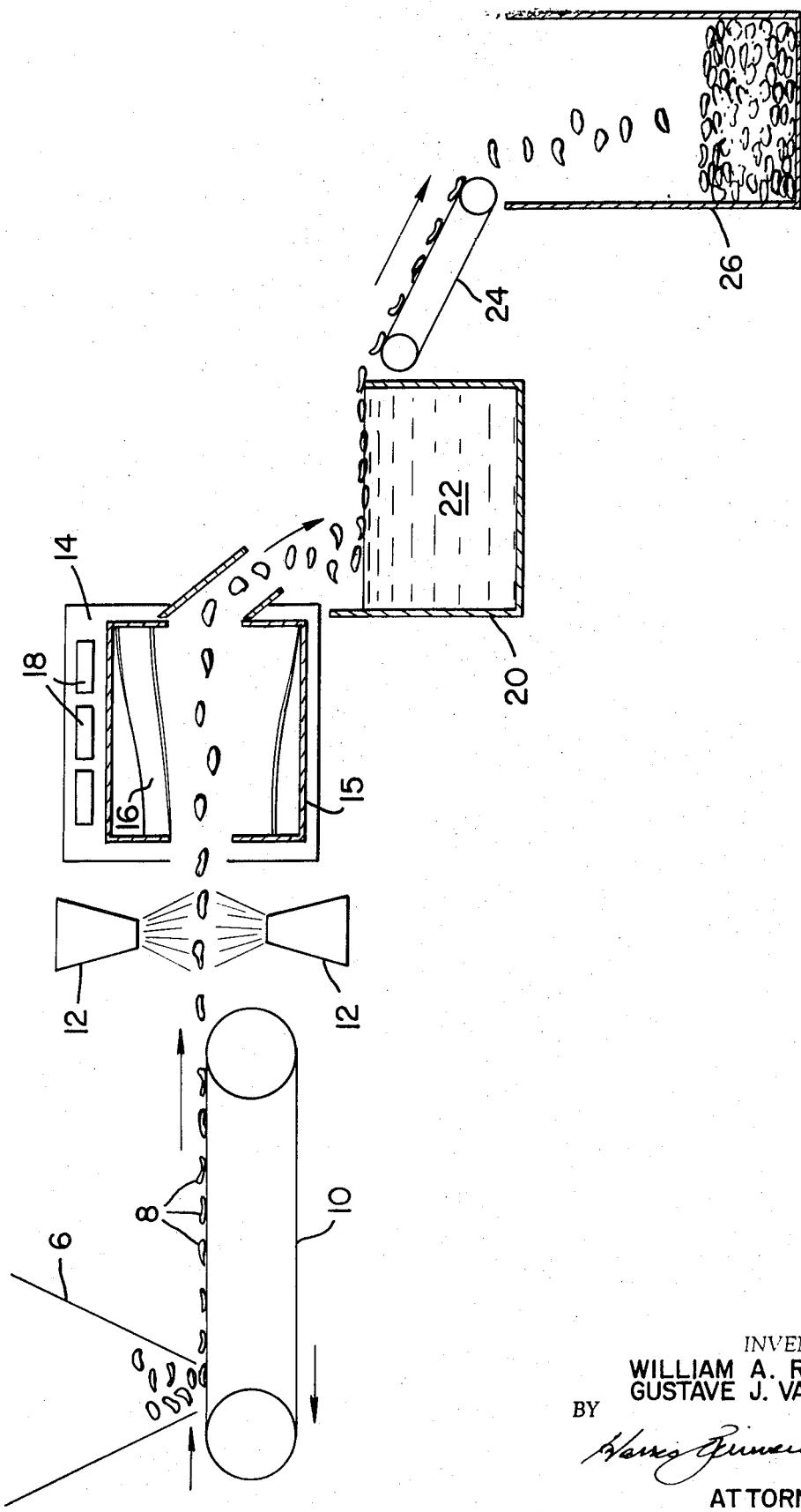

William A. Rock and Gustave J. Valleroy, Castro Valley, Calif., assignors to Cornnuts, Inc., Oakland, Calif.
Filed July 24, 1970, Ser. No. 57,951
Int. Cl. A23b 7/02, 7/03; A23l 1/12
U.S. Cl. 99—104                                   7 Claims

ABSTRACT OF THE DISCLOSURE

A process for preparing a potato snack product in which dehydrated potato pieces are placed in a steam atmosphere to increase their moisture content to about 13% to 14% and their temperature to about 212° F. Such pieces are then deposited in cooking oil maintained at a temperature of close to 400° F. for about 5½ seconds at which time the pieces will be cooked and following air cooling will have a moisture content of about 4%.

BACKGROUND OF THE INVENTION

The broad concept of placing discretely cut, diced or sliced potato pieces into a bath of cooking oil to produce a potato chip or snack product is not new in the art. It has also been previously suggested to start with dehydrated potato pieces, i.e. diced or sliced pieces in which a substantial portion of the moisture has been removed. The present invention is directed towards this latter type of process in which dehydrated potato pieces are used, but which overcomes many problems and undesirable features and characteristics of processes heretofore practiced.

In the production of a potato chip product from a dehydrated potato chip, dice or slice, there are numerous variables, all of which have a bearing on the appearance and palatability of the finished product. By way of example, the degree of dehydration in the starting material will have a bearing on the stability of the product; the amount of moisture in the pieces and their temperature as they are introduced into the cooking oil are important; and the oil temperature and dwell time of the pieces in the oil are also relevant factors which must be considered. The reasons for establishing defined parameters for these variables will be hereinafter discussed in more detail. At this time, however, it may be stated that in accordance with the present invention, optimum processing conditions are imposed which result in a crisp, good appearing and tasty chip product which exhibits superior shelf life characteristics.

THE DRAWING

The figure is a diagrammatic representation of the steps of the process employed in the present invention.

DESCRIPTION OF THE PREFERRED EMBODIMENT

Referring briefly to the drawing and the schematic representation of the equipment utilized in carrying out the process about to be described, it may be explained that discretely cut diced potatoes, in a dehydrated state, are deposited in a supply hopper 6. The pieces 8 are gravitally deposited onto a high speed belt conveyor 10 from which they are catapulted between opposed water spray nozzles 12 into a chamber 14 in which a steam atmosphere is maintained. A tumbling drum or reel 15 is provided in the chamber and has a helical flight 16 therein to provide for the tumbling travel and proper exposure of the pieces to the steam in the chamber. Radiant heaters 18 are also provided within the chamber 14 for a purpose which will be hereinafter explained. Upon leaving the drum 15, the pieces are deposited in a tank 20 containing heated cooking oil 22 from which the now cooked chips pass into a draining and cooling conveyor 24 into a storage container 26 or the like.

While certain of the steps as above described are familiar to those skilled in the art, other steps are novel, and in any event, the optimum moisture conditions, temperature ranges and time dwell periods comprise the basis of the present invention.

The diced or sliced potato pieces 8 preferably possess a maximum thickness of about three-sixteenths of an inch, and of course, possess a lesser thickness after dehydration. Potatoes having a high solid content, i.e. a high specific gravity are also preferred, and in this connection it should be pointed out that the average potato has a moisture range of from about 75% to 90%, the potatoes currently being used in practicing the process of this invention having about an 80% moisture content, or about 4 times more water than solids. For reasons which will be made clearer when the cooking step is described, the potato pieces 8 should have a moisture content of about 12% to 15% and preferably between 13% and 14% when deposited in the oil 22. Thus, in order to properly cook or fry the pieces, it is necessary to either start with dehydrated potato pieces or to dehydrate the pieces prior to cooking. We prefer to start with dehydrated pieces containing less than 13% moisture, and dehydrated potatoes of about 5% to 7% moisture content are commercially available. Dehydrated potato pieces with such a moisture content may be conventionally stored, are relatively stable, and no shrinkage results as in the case of non-dehydrated potatoes. If the starting pieces had the optimum moisture content for cooking, i.e. about 13% to 14%, they would be difficult to hold for any periods of time since mold or other deleterious effects might result. Desirably, pieces having an initial dehydrated moisture content of about 8% to 10% should be used, but since dehydrated pieces containing about 5% to 7% moisture are commercially available, the process will be described with the latter product, if the 8% or 10% dehydrated pieces could be obtained, the water spray step about to be described could be eliminated.

Assuming, therefore, that the pieces in the hopper 6 have about a 5% moisture content, the pieces 8 are deposited on the high speed horizontal conveyor belt 10 and at the end of the upper belt reach are thrown horizontally outwardly towards and into the drum 15 within steam chamber 14. Before reaching the inlet to the drum, the pieces, which are then suspended in the air in the space between the belt 10 and the drum, pass between the water spray nozzles 12, and are discretely exposed to the water spray from the nozzles. The period of time it takes each piece to pass through such spray results in a raising of the moisture content to about 8% to 10%, which, as previously stated, is the desired moisture content for the starting material. If the starting pieces already had such a moisture content, the water spray step would be eliminated. It should be explained that very small quantities of water are required to raise the pieces from a 5% to an 8% or 10% moisture content while providing a uniform moisture application. If the pieces were immersed in water for even a very short time, excessive moisture would be picked up, but by exposing all surfaces of each piece to the fine water spray, the desired additional moisture can be readily controlled.

It was previously stated that the desired moisture content for the pieces when introduced into the cooking oil is about 13% to 14%, and some question might be raised as to why the pieces are not subjected to the water spray for a longer period of time or until this higher moisture ratio was attained. There are two primary reasons why this is not desirable. First, the water spray does not result in a homogeneous distribution of water, since the water is primarily on the surface of the pieces. Secondly, there are advantages attained if the temperature of the pieces when placed in the oil is higher than that obtainable with a water spray system.

Accordingly, as the next step in the process the potato pieces now having a moisture content of about 8% to 10% are subjected to a steam atmosphere in the rotating drum or reel 15. Steam may be introduced into the chamber 14 at about 40 p.s.i. gauge, but this is not critical, since the chamber is open and the temperature in the chamber and reel will therefore approach 212° F. As the pieces travel through the length of the reel, a uniform wetting and heating of the pieces is accomplished, and with a travel time in the reel of between 3 to 30 minutes, and preferably about 8 minutes, the emerging pieces will have a uniform moisture content of about 13% to 14%, and a temperature of about 212° F.

As will be understood, within the rotating reel there exists a thermal exchange of heat between the steam and potato pieces. It is important that the steam entering chamber 14 does not impinge directly on the reel surface, since this could result in surface condensation and an uncontrollable quantity of moisture on the reel and an excessive wetting of the product. Also, the radiant heaters 18 are provided in the chamber 14 above the reel 15 to further prevent moisture condensation on the reel surface. In any event, the dwell or travel time of the pieces results in the desired 13% to 14% moisture as well as the desired elevated temperature prior to cooking.

Using an atmospheric steam chamber 14, a thermal exchange equilibrium is reached when the potato pieces reach a temperature of 212° F. At such time, no additional moisture is absorbed by the pieces since there no longer exists any condensation of the steam on the pieces. With normal ambient temperature conditions, e.g., 60° to 90° F., if the pieces entering the steam chamber had an initial moisture content of about 5%, the equilibrium state would be reached when the temperature of the pieces rose to 212° F., but the moisture content would only be increased to about 10%. Thus, for a given starting temperature, the steam will only add a certain amount of moisture to the pieces irrespective of their length of time in the chamber. If is for this reason that the water spray nozzles 12 or other means are provided to insure that the pieces entering the drum 15 have a moisture content of about 8% to 10%, so that upon leaving the drum the desired 13% to 14% moisture content and a temperature of 212° F. is achieved.

From the steam step of the process, the pieces are next immersed in the tank 20 which contains cooking oil maintained at a temperature of from about 350° to 425° F., and such pieces are permitted to remain in the oil for about 5 to 6 seconds. Since the particular mechanism for removing the cooked pieces is not a part of the present invention, no detailed explanation is deemed necessary.

When the pieces are placed in the hot cooking oil, the moisture contained therein flashes into steam, effecting a rupturing of the inter-cellular bond. This results in a tenderizing by controlled expansion, and a more palatable product. Since moisture within the piece is flashed into steam, a dehydration of the piece occurs and after the 5 to 6 second cooking period, the pieces emerge with a final moisture content of about 3½ to 5%, which is within a desired range for a potato snack product.

If the pieces have a moisture content of below about 12% when deposited in the oil, the resulting product has a mushy as distinguished from a crisp taste, and apparently the starches and proteins give the product a chalky opaque appearance as distinguished from a more desirable translucent appearance. Conversely, if the pieces have a moisture content of about 15% when placed in the oil, the end product will not be sufficiently expanded and be somewhat wet and soft, rather than crisp. Furthermore, in order to bring the moisture content of the end product down to below 5%, additional cooking time and or drying time and drying operations are required to obtain a desirable crisp texture and keeping quality.

If the pieces are in the cooking oil for a longer period of time than that mentioned, there is a tendency to scorch and darken the end product, especially with pieces containing higher reducing sugars, while a lesser time results in lack of sufficient dehydration, undercooking, and insufficient puffing or expansion of the pieces.

After the finished pieces are cooled and deposited in the container 26, flavoring, salting or similar operations may be performed in any of the well-known manners.

We claim:
1. A process for producing a potato snack product which consists of treating discrete pieces of potatoes to bring their moisture content to about 12% to 15%, introducing said pieces into a bath of cooking oil maintained at a temperature of about 350° to 425° F., and removing said pieces after the moisture content has been reduced to about 4% by flashing of the moisture into steam.

2. A process as set forth in claim 1 in which said pieces are heated prior to introduction thereof into said oil.

3. A process as set forth in claim 2 in which said pieces are heated to a temperature of close to 212° F. prior to introduction thereof into said oil.

4. process as set forth in claim 1 in which said discrete pieces have an initial moisture content of no more than 10% and subjecting said pieces to a steam atmosphere until the moisture content is raised to about 12% to 15% and the temperature of said pieces is raised to close to that of the steam.

5. A process as set forth in claim 4 in which said discrete pieces have an initial moisture content of about 5% to 7% and exposing all surfaces of said pieces to a water spray prior to subjecting the same to said steam atmosphere until the moisture content is raised to about 8% to 10%.

6. A process as set forth in claim 1 in which said pieces remain in said oil for a period of about 4 to 6 seconds.

7. A process as set forth in claim 1 in which said pieces have a moisture content of about 13% to 14% and a temperature of about 200° F. when introduced into said oil.

References Cited
UNITED STATES PATENTS

| | | | |
|---|---|---|---|
| 2,101,506 | 12/1937 | Morrow | 99—207 |
| 3,044,880 | 7/1962 | Bogyo | 99—100 |
| 3,355,299 | 11/1967 | McLaughlin | 99—100 |
| 3,397,993 | 8/1968 | Strong | 99—100 |
| 3,410,702 | 11/1968 | Frank | 99—207 |

FOREIGN PATENTS

| | | | |
|---|---|---|---|
| 1,034,035 | 6/1966 | Great Britain | 99—100 |

WILBUR L. BASCOMB, Jr., Primary Examiner

M. G. MULLEN, Assistant Examiner

U.S. Cl. X.R.

99—100 P, 207